United States Patent [19]

Wagner

[11] Patent Number: 5,071,181

[45] Date of Patent: Dec. 10, 1991

[54] SECUREMENT FOR A RESILIENT VEHICLE SIDE BUMPER

[76] Inventor: Scott J. Wagner, 28 Westwood Dr., Fort Madison, Iowa 52627

[21] Appl. No.: 615,458

[22] Filed: Nov. 19, 1990

[51] Int. Cl.[5] .............................................. B60R 19/42
[52] U.S. Cl. ................................... 293/128; 293/154; 293/155; 24/265 R; 248/499
[58] Field of Search ............... 293/124, 128, 154, 155; 296/136; 24/115 J, 265 R, 301, 289; 410/110, 116; 150/166; 248/499, 500, 503

[56] References Cited

U.S. PATENT DOCUMENTS

| | | | |
|---|---|---|---|
| 83,075 | 10/1968 | McMaster | 24/115 J |
| 417,180 | 12/1989 | Harvey | 24/115 J |
| 1,516,489 | 11/1924 | Barton | 248/499 X |
| 2,311,514 | 2/1943 | Bramblett | 296/136 X |
| 2,594,491 | 4/1952 | Persons | 280/770 X |
| 2,734,765 | 2/1956 | Henderson et al. | 293/128 |
| 2,889,165 | 6/1959 | Zientara | 293/128 X |
| 3,243,223 | 3/1966 | Hoshell | 293/128 X |
| 3,472,546 | 10/1969 | Samuels | 293/1 |
| 4,002,363 | 1/1977 | James | 293/128 |
| 4,493,502 | 1/1985 | Campbell, Jr. | 280/770 X |
| 4,674,783 | 6/1987 | Hogan | 293/128 |
| 4,707,008 | 11/1987 | Falco | 293/128 |
| 4,708,380 | 11/1987 | Cruz | 293/128 |
| 4,726,614 | 2/1988 | Myers et al. | 293/128 |
| 4,796,935 | 1/1989 | Maraia | 293/128 |
| 4,810,013 | 3/1989 | Spears | 293/128 |
| 4,810,015 | 3/1989 | McNeil | 293/128 |
| 4,828,302 | 5/1989 | Marasigan, Jr. | 293/128 |
| 4,828,303 | 5/1989 | Soria | 293/128 |
| 4,952,007 | 8/1990 | Shahrokh | 296/136 X |
| 4,969,674 | 11/1990 | Wagner | 293/128 |

FOREIGN PATENT DOCUMENTS

| | | | |
|---|---|---|---|
| 3308531 | 9/1984 | Fed. Rep. of Germany | 24/265 R |
| 0981048 | 12/1982 | U.S.S.R. | 24/265 R |

*Primary Examiner*—Dennis H. Pedder
*Attorney, Agent, or Firm*—Kent A. Herink; Brian J. Laurenzo

[57] ABSTRACT

A resilient vehicle side bumper having an elongated body member and fastening members extended from forward and rearward end portions of the elongated body member for releasably securing the side bumper to the vehicle. A first fastening member is included with an elastic member for connecting the first fastening member to the elongated body member, the elastic member further capable of expanding sufficiently to allow the first fastening member to be interconnected with a second fastening member mounted on the vehicle. A locking device is included which, when engaged, blocks the first fastening member from undesired disconnection from the second fastening member. A fastening member attached to the end of the elastic member is comprised of a cylindrical body having an arcuate passageway for receipt of the elastic member. The arcuate passageway extends from an entrance port in an outer side edge of the cylindrical body to an exit port in the outer side edge of the cylindrical body.

30 Claims, 6 Drawing Sheets

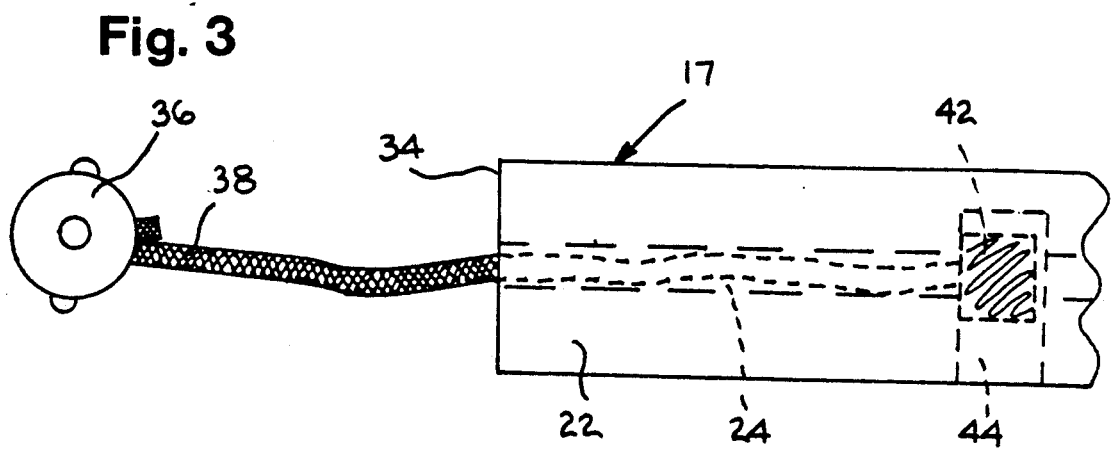
Fig. 3
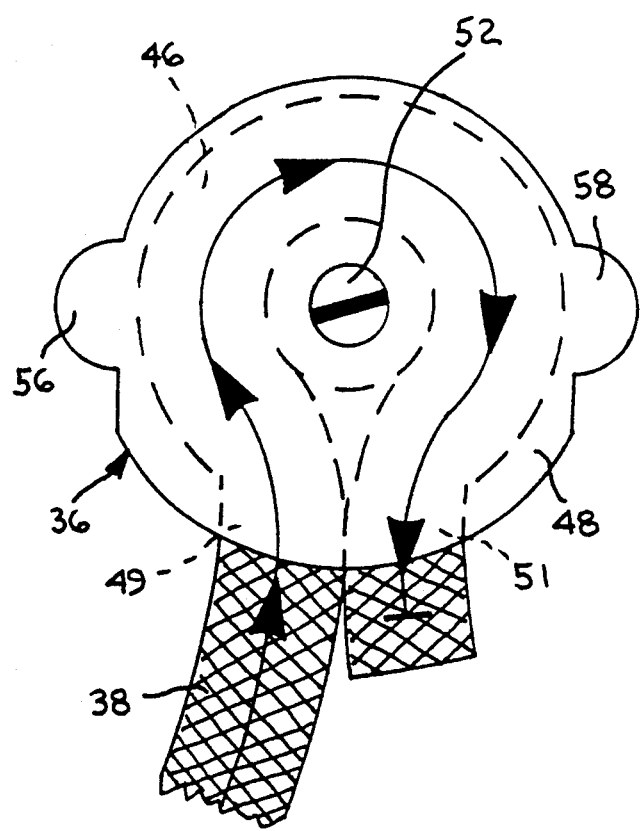
Fig. 4
Fig. 5

SECUREMENT FOR A RESILIENT VEHICLE SIDE BUMPER

BACKGROUND OF THE INVENTION

This invention relates to resilient bumpers for the sides of vehicles and, more particularly, to a resilient bumper for releasable attachment to the side of a vehicle for protection of the vehicle against damage from impact of a door of another vehicle or the like.

To conserve the amount of space required for parking vehicles, owners of parking ramps and parking lots, as well as civil engineers who design municipal parking areas, make the sizes of individual parking places relatively narrow. As a result, adjacent vehicles are usually so close that an uncarefully opened door of one vehicle will come into contact with the side of an adjacent vehicle. If the contact is sufficiently violent, the finish of one or both vehicles may be damaged, a dent may be made in the side of the contacted vehicle, or both. While many vehicles are provided with a fixed body side molding intended to protect the side of the vehicle, such moldings are often not in the appropriate position to prevent damage from contact with another vehicle door or the like.

Flexibility in positioning a side bumper is, accordingly, desirable. It is also desirable, however, to prevent theft of the side bumper from the vehicle. Moreover, vehicles vary greatly in the size and shape and contour of their sides and doors so that any side bumper must be adaptable to be usable with the variety of different vehicles.

A number of attempts have been made to provide side bumpers for vehicles. These side bumpers generally are made of resilient material and are secured to the vehicle by retaining hooks, suction cups or magnets. The hooks are usually held at the edges of the vehicle doors. In addition, the side bumpers may include an enlarged locking device which fits between an open vehicle door and a vehicle fender, and upon closing and locking the vehicle door, the enlarged locking device will not pass through the opening, thereby preventing theft of the side bumper while in use.

None of these prior art devices, however, are secured and locked to a vehicle through the cooperation of a first fastening member which is attached to the side bumper by an elastic member for adjustable connection of the first fastening member to a desired location on the vehicle. In addition, none of the prior art discloses a second mated fastening member which resides on the vehicle for interconnected cooperation with the first fastening member, the second fastening member residing on the vehicle, even when the side bumper is not in use. Such securement of a side bumper would enable the same side bumper to be used with varying lengths of vehicles without actual length adjustment of the side bumper itself. Furthermore, if the securement for the vehicle side bumper comprised a fastening member on the side bumper as well as a mated fastening member on the vehicle, this two piece cooperation would create an appropriate environment for utilization of a mechanical locking device such as a padlock or key-initiated cylinder lock to prevent theft of the side bumper from the vehicle during use.

SUMMARY OF THE INVENTION

Accordingly, it is an object of the present invention to provide means for securing a vehicle side bumper which may be used with vehicles of varying lengths.

It is another object of the present invention to provide means for securing a vehicle side bumper which include a first fastening member which is attached to the side bumper by an expandable member for adjustable connection of the first fastening member to a desired location on the vehicle.

It is still another object of the present invention to provide a first fastening member which is elastically connected to the vehicle side bumper for adjustable interconnected cooperation with a second mated fastening member residing on the vehicle.

Yet another object of the present invention is to provide means for locking the first and second fastening members together thereby locking the side bumper to the vehicle.

An additional object of the present invention is to provide a fastening member with means for receiving an elastic member therein.

The present invention is a resilient side bumper for vehicles and includes a main body member made of molded or extruded resilient materials such as plastic or rubber. The vehicle side bumper comprises means extended from the forward and rearward end portions for releasably securing the side bumper to the vehicle including a first fastening member and an elastic member for connecting the first fastening member to the resilient body member, the elastic member further being capable of expanding sufficiently to allow the first fastening member to be fastened at a desired location upon the vehicle. The securing means may further comprise a second mated fastening member which is mounted to the vehicle for receiving the first fastening member of the resilient body member. The resilient vehicle side bumper may further comprise locking means including a locking device for cooperation with the first and second fastening members such that when the first fastening member and the second fastening member are interconnected and the locking device is engaged, the first fastening member may not be disconnected from the second fastening member. The invention further includes a first fastening member attached to the elastic member which is comprised of a cylindrical body having an arcuate passageway for receipt of the elastic member. The arcuate passageway extends from an entrance port in an outer side edge of the cylindrical body to an exit port in the outer side edge of the cylindrical body.

BRIEF DESCRIPTION OF THE DRAWINGS

FIG. 3 is a partial side view of the resilient side bumper;

FIG. 4 is a partial side view of the fastening member of the resilient side bumper;

FIG. 5 is a partial plan view of the fastening member shown in FIG. 4;

DETAILED DESCRIPTION OF THE INVENTION

Figure 1:
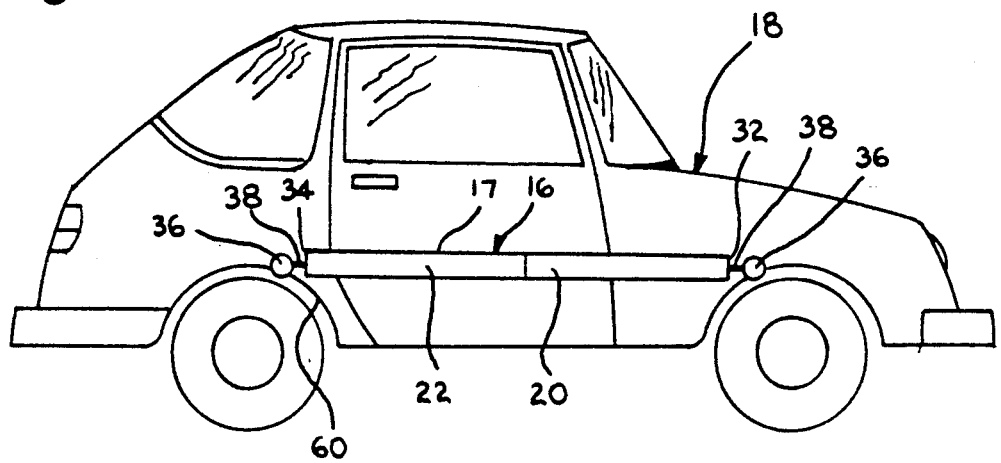
FIG. 1 is a side view of a vehicle on which has been mounted a pair of resilient side bumpers of the present invention and which depicts both sides of the vehicle in that the other side is identical except facing in the other direction.
Figure 2:
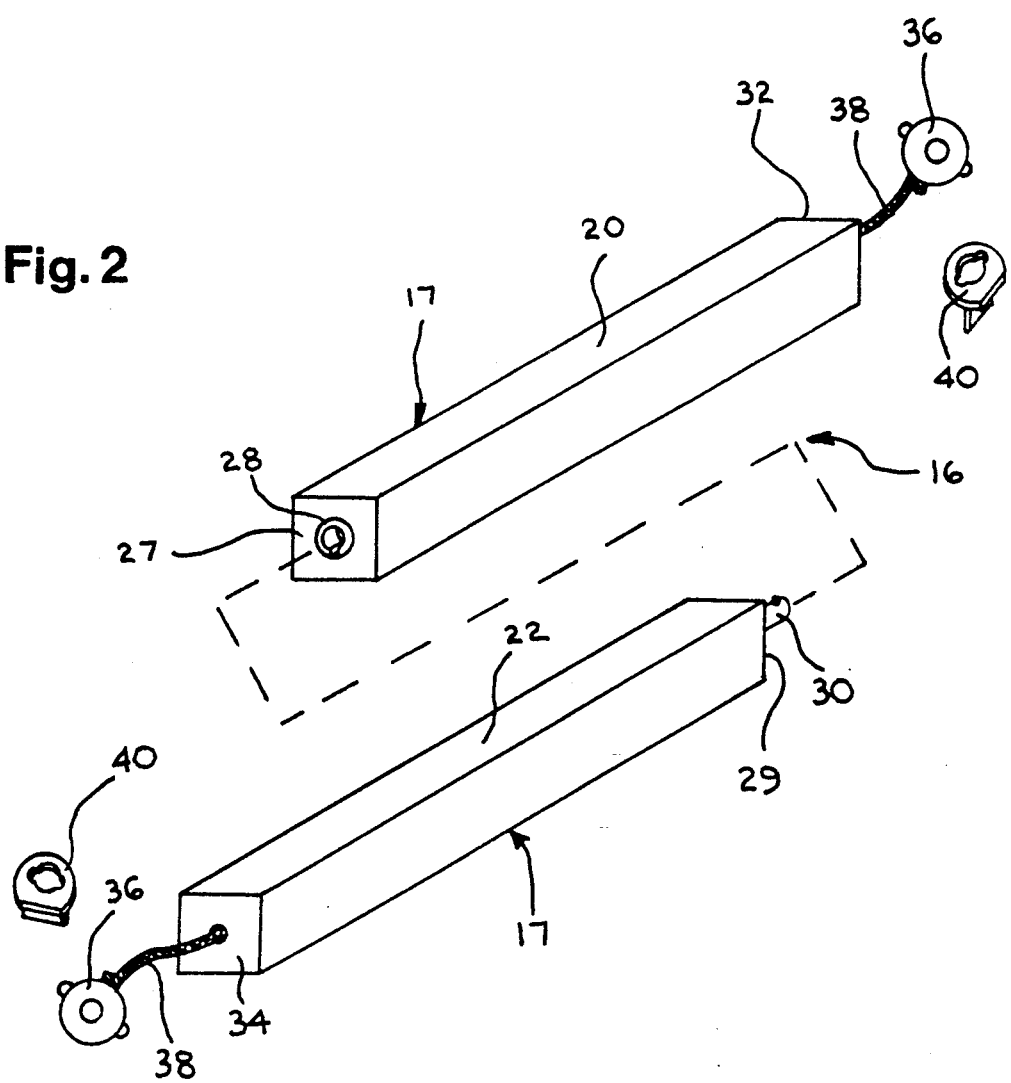
FIG. 2 is an exploded perspective view of the resilient side bumper.

Illustrated in FIG. 1, generally at 16, is a vehicle side bumper attached to the side of a vehicle 18 wherein first fastening members 36 are elastically attached to an elongated body member 17 for cooperation with second fastening members 40 which are mounted upon the vehicle 18. The side bumper 16 includes a forward portion 20 and a rearward portion 22 (FIG. 2) which are of a resilient material. In a preferred embodiment of the invention, the forward and rearward portions 20 and 22 are made of extruded cross-linked polyethylene with cylindrical hollow inner cores 24 (FIG. 3). The forward section 20 has inserted in an inner end 27 a female portion 28 of a connecting device. The rearward section 22 has projected from an inner end 29 a male portion 30 of the connecting device. Thus, when the male portion 30 is received in the female portion 28, the rearward section 22 and the forward section 20 are connected to form the elongated body member 17.

Figure 6:
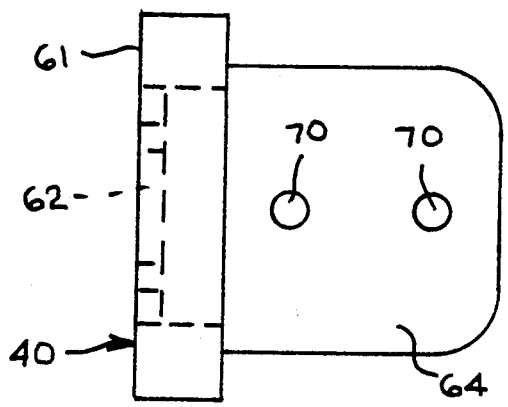
FIG. 6 is a side view of a second fastening member.

The vehicle side bumper 16 of the present invention comprises means for releasably securing the side bumper 16 to the vehicle 18 which are extended from the outer end portions 32 and 34 of the forward section 20 and the rearward section 22 respectively. Since the forward section 20 and the rearward section 22 are mirror images of each other, only the rearward section 22 need be described. The securing means at the outer end 34 of the elongated body member 17 include the first fastening member 36 and an elastic member 38 for connecting the first fastening member 36 to the outer end 34 of the elongated body member 17. The elastic member 38 is capable of expanding sufficiently to allow the first fastening member 36 to be fastened at a desired location upon the vehicle 18. The securing means further comprise the second mated fastening member 40 (FIG. 6) mounted to the vehicle 18 for receiving the first fastening member 36 of the elongated body member 17.

The expandable member 38 may be comprised of an elastic cord or strap which passes through the hollow core 24 of the elongated body member 17 and is retained within the outer end portion 34 of the resilient body member 17 by its attachment to a stop piece 42 which is located in a transverse slot 44 and is larger than the diameter of the hollow core 26.

Figure 5A:
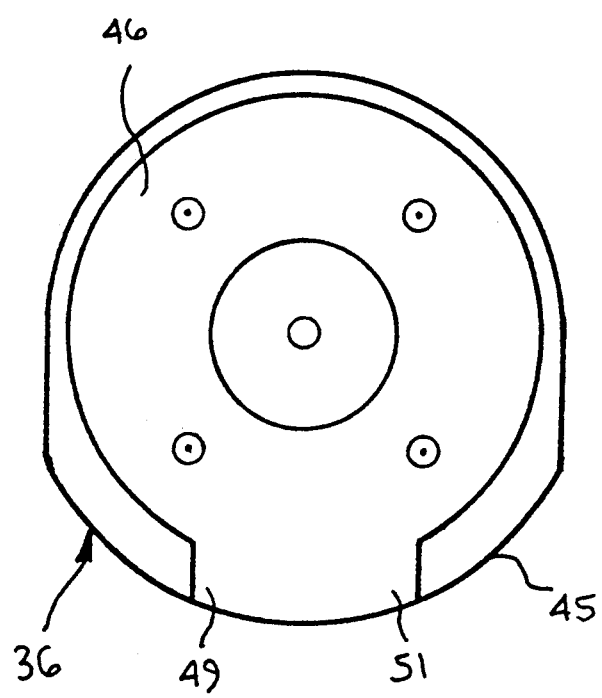
FIG. 5a is a plan view of the cylindrical body of the fastening member of FIG. 4 with an open arcuate passageway.

The other end of the expandable member 38 is attached to the first fastening member 36 which, in accordance with the present invention, is configured as shown in FIGS. 4 and 5. The first fastening member 36 includes a cylindrical body 45 having an arcuate passageway 46 which is open on the top and has an entrance port at 49 and an exit port at 51 through which the expandable member 38 is threaded in the direction of the arrows shown in FIG. 5. The first fastening member 36 additionally includes a disk-shaped cover 48 which fits over the cylindrical body 45 thereby closing off the open top of the arcuate passageway 46. The diameter of the expandable member 38 is larger than that of the arcuate passageway 46. Accordingly, when the disk-shaped cover 48 is placed over the cylindrical body 45 of the first fastening member 36 and is secured thereto, the expandable member 38 is compressed and restrained against undesired removal. The retention of the expandable member 38 may be enhanced by providing downwardly protruded teeth 50 in the disk-shaped cover 48 and upwardly protruded teeth 51 in the arcuate passageway 46 at locations which will penetrate and grip the expandable member 38. The disk-shaped cover 48 may be secured to the cylindrical body 45 of the first fastening member 36 via a threaded screw 52. Furthermore, the first fastening member 36 includes a projected pin 54 for cooperation with the second mated fastening member 40 on the vehicle 18. The first fastening member 36 may also include tabbed handles 56 and 58 to facilitate manipulation of the first fastening member 36 by a user.

Figure 7:
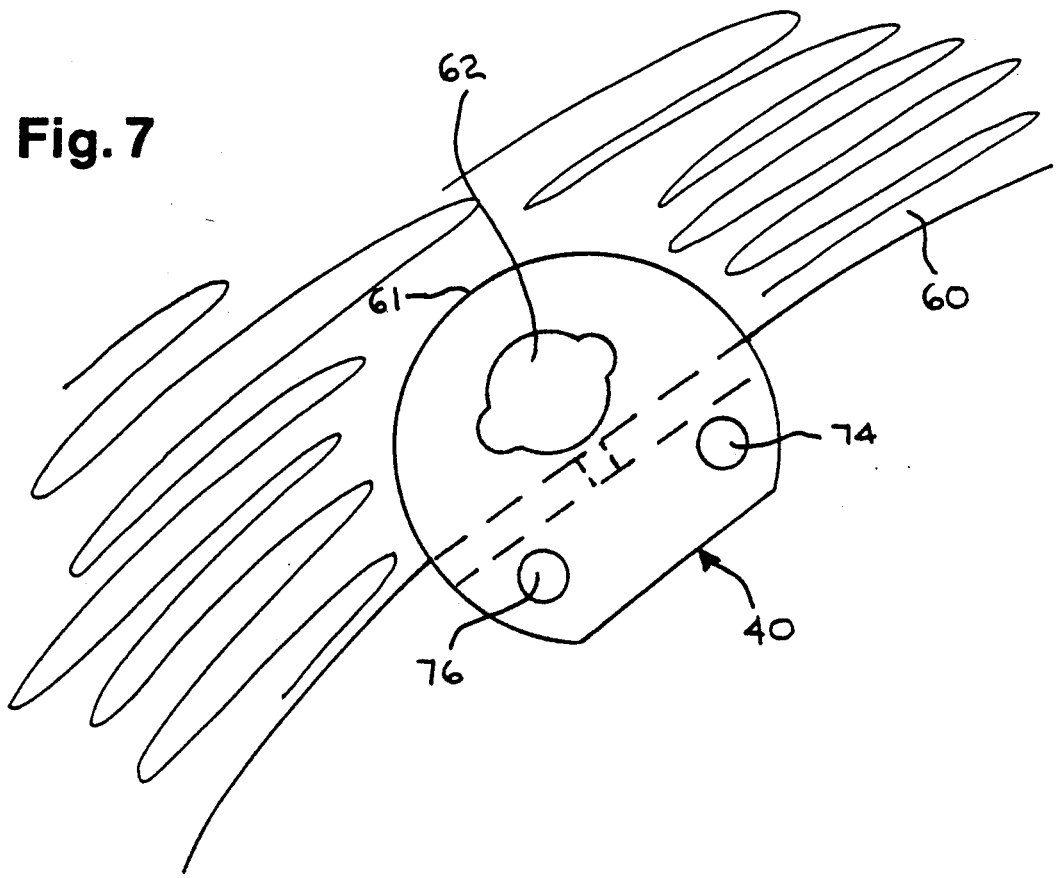
FIG. 7 is an elevation view of a second fastening member attached to a fender of a vehicle.
Figure 8:
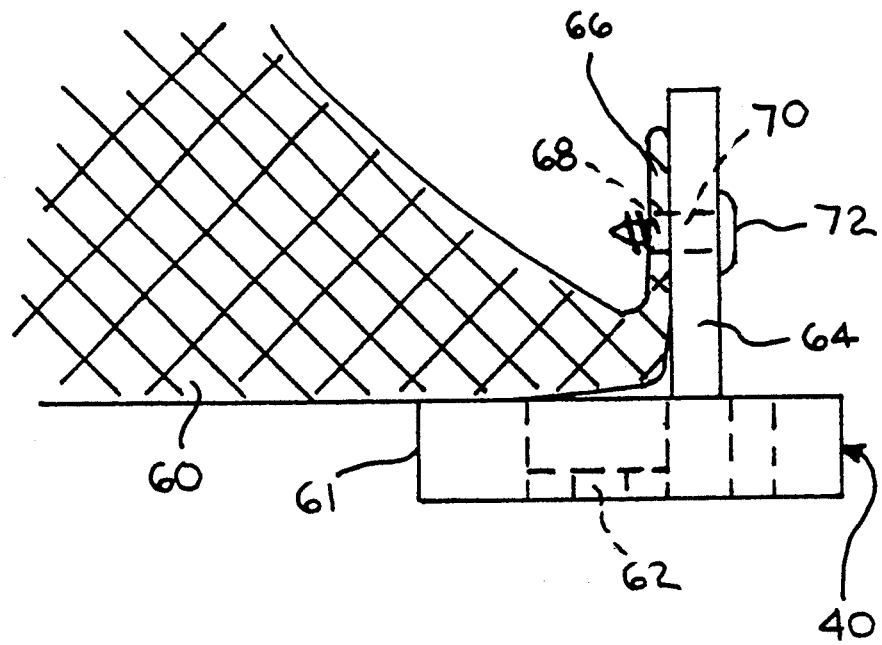
FIG. 8 is a top plan view of the second fastening member shown in FIG. 6 and again showing the fender of the vehicle.

The preferred embodiment of the second fastening member 40 may be configured as shown attached to a rear fender 60 of the vehicle 18 in FIGS. 7 and 8. The second fastening member 40 comprises a cylindrical seat 61 including a slot 62 for receiving the projected pin 54 of the first fastening member 36 as well as a transverse tab portion 64 which extends along a flange 66 of the fender 60. The tab portion 64 and the flange 66 of the fender 60 have aligned apertures 68 and 70 for receiving securement screws 72.

Figure 9:
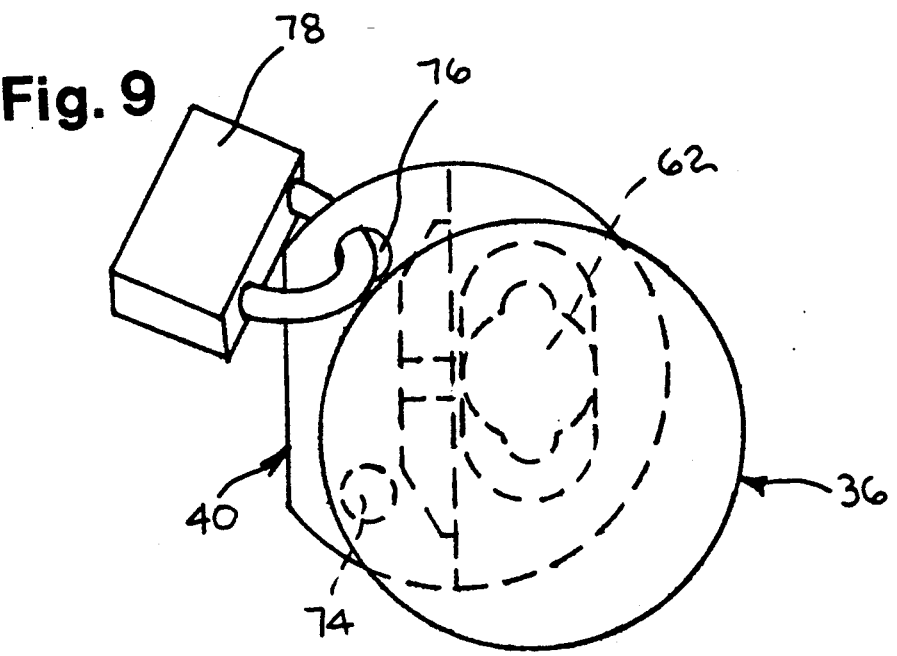
FIG. 9 shows a set of interconnected first and second fastening members as locked in place by the locking device shown.
Figure 10:
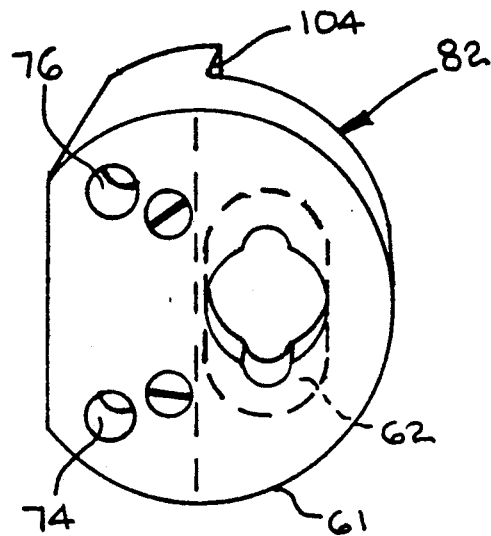
FIG. 10 is a perspective view of an alternative second fastening member.
Figure 11:
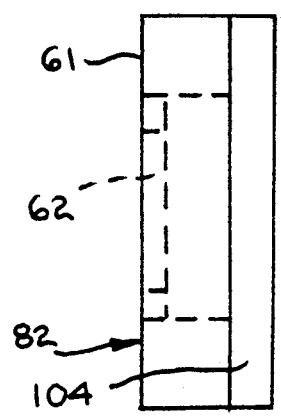
FIG. 11 is a side view of the alternative second fastening member shown in FIG. 10.
Figure 12:
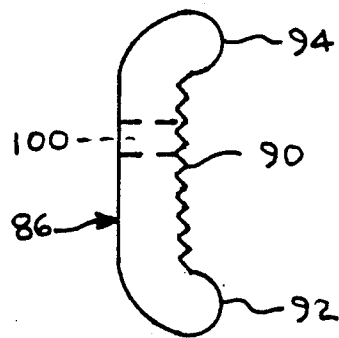
FIG. 12 is a side view of a clamping portion for the alternative second fastening member shown in FIG. 10.
Figure 13:
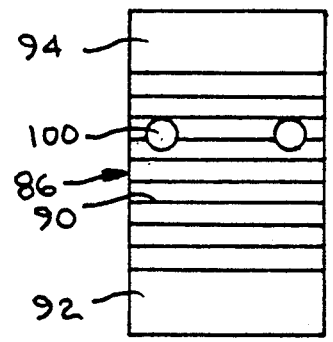
FIG. 13 is a plan view of the clamping portion shown in FIG. 12.
Figure 14:
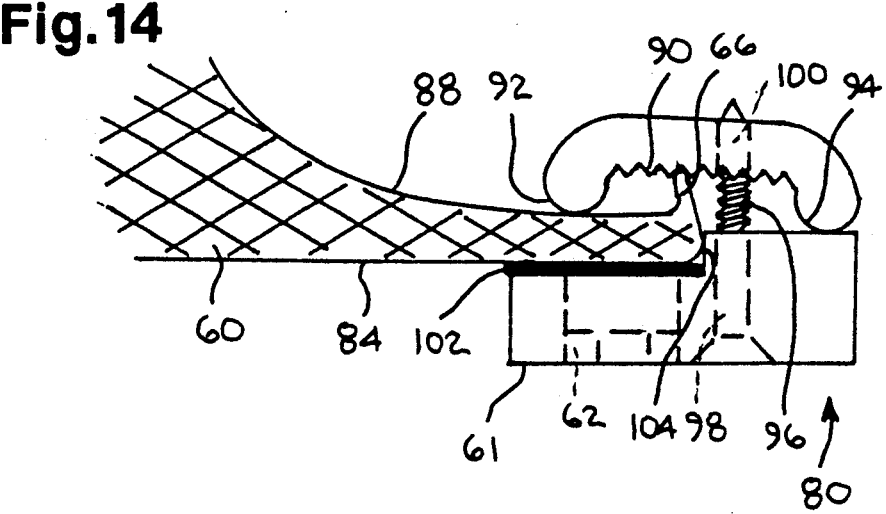
FIG. 14 is a top plan view of the alternative second fastening member as attached to a fender of a second vehicle.

Locking means are shown in FIG. 9 in which the first fastening member 36 and the second fastening member 40 have been interconnected via the seating of the projected pin 54 of the first fastening member 36 within the slot 62 of the second fastening member 40. Left and right-handed holes 74 and 76 are located on the second fastening member 40 in such a manner that, upon the interconnection of the first fastening member 36 and the second fastening member 40, one of the holes 74 and 76 is capable of receiving a locking device such as the padlock 78 shown. When the locking device 78 is engaged, it is not possible to remove the first fastening member 36 from the second fastening member 40 as the first fastening member 36 is blocked from movement. While hole 76 is shown in FIG. 9 to receive the locking device 78 on the rear fender 60, it is to be understood that the other locking hole 74 would receive the locking device 78 on the front fender (not shown) of the vehicle 18.

A second embodiment of a second fastening member 40 is shown in FIGS. 10-14 wherein the second fastening member 40 comprises a two-piece clamping member 80 which is clamped about the rear fender 60 of the vehicle 18. The clamping member 80 does not require securement screws 72 as in the preferred embodiment, but instead includes a first piece 82 which, when clamped to the fender 60, is located on the outer surface 84 of the fender 60 and a second piece 86 which, when clamped to the fender 60, is located on the inner surface 88 of the fender 60. The second piece 86 of the clamping member 80 comprises a saw-toothed surface 90 for gripping the in-turned flange 66 of the fender 60. The second piece 86 of the clamping member 80 further comprises a first radiused foot 92 for contact with the inner surface 88 of the fender 60 and a second radiused foot 94 for contact with the first piece 82 of the clamping member 80. The first piece 82 and the second piece 86 of the clamping member 80 are held together and tightened by a threaded screw 96 which passes through aligned apertures 98 and 100 in the first and second pieces 82 and 86 of the clamping member 80 respectively. A rubber pad 102 may be placed between the first piece 82 of the clamping member 80 and the outer surface 84 of the fender 60 to protect the paint finish on the fender 60.

This second embodiment is preferred when the in-turned flange 66 of a vehicle fender 60 is not wide enough to accommodate the transverse tabbed portion 64 and the securement screws 72 of the preferred embodiment. The first and second radiused feet 92 and 94 allow the clamping member 80 to be used with fenders of various thicknesses and flange widths. The first piece 82 of the clamping member 80 may include a shoulder portion 104 for locating the first piece 82 of the clamping member 80 on the fender 60.

A plurality of suction cups and magnetic strips (not shown) may also be included in the side bumper 16 which extend below the bottom surface of the elongated body member 17 and function to assist in the releasable attachment of the side bumper 16 to the vehicle 18.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while a padlock is shown in the preferred embodiment as the locking device 78, it is contemplated that a key-initiated bolt or cylinder lock could be incorporated to block removal of the projected pin 54 of the first fastening member 36 from the slot 62 of the second fastening member 40.

I claim:

1. A resilient vehicle side bumper, comprising:
   (a) a resilient body member having a forward section and a rearward section;
   (b) coacting end portions of said forward and rearward sections for releasably joining said forward and rearward sections to form said resilient body member; and
   (c) means extending from the end portions opposite said coacting end portions of said forward and rearward sections for releasably securing the side bumper to the vehicle, said securing means comprising a first fastening and an expandable member for connecting said first fastening member to said resilient body member, said expandable member capable of expanding sufficiently to allow said first fastening member to be fastened at a desired location upon said vehicle, said first fastening member comprising a cylindrical body having an arcuate passageway for receipt of said expandable member, said arcuate passageway extending from an entrance port in an outer side edge of said cylindrical body to an exit port in said outer side edge of said cylindrical body, said securing means further comprising a second mated fastening member mounted to said vehicle for receiving said first fastening member of said resilient body member.

2. The resilient vehicle side bumper of claim 1, further comprising:
   means for connecting said first fastening member and said second fastening member together.

3. The resilient vehicle side bumper of claim 2, wherein said connecting means comprise:
   (a) a projected pin located upon said first fastening member; and
   (b) a slot located in said second fastening member for receiving said pin of said first fastening member.

4. The resilient vehicle side bumper of claim 3 further comprising:
   means for locking said first and second fastening members together.

5. The resilient vehicle side bumper of claim 4, wherein said locking means comprise:
   a locking device integrated with said second fastening member such that when said projected pin of said first fastening member is received in said slot of said second fastening member and said locking device is engaged, said locking device blocks removal of said projected pin of said first fastening member from said slot of said second fastening member.

6. The resilient vehicle side bumper of claim 1, wherein:
   said arcuate passageway in said cylindrical body of said first fastening member is open in its upper direction.

7. The resilient vehicle side bumper of claim 6, wherein:
   said first fastening member includes a cover for fitment atop said cylindrical body and over said open arcuate passageway.

8. The resilient vehicle side bumper of claim 1, wherein:
   said entrance port and said exit port of said arcuate passageway are located proximate to one another in said outer side edge of said cylindrical body.

9. The resilient vehicle side bumper of claim 1, wherein:
   said expandable member has a diameter greater than a diameter of said arcuate passageway.

10. The resilient vehicle side bumper of claim 7, wherein:
    said first fastening member includes protruded teeth for penetrating and gripping said expandable member.

11. The resilient vehicle side bumper of claim 1 wherein:
    said second fastening member is mounted to said vehicle by a threaded screw which passes through aligned apertures in said second fastening member and a fender of said vehicle.

12. The resilient vehicle side bumper of claim 1, wherein:
    said second fastening member comprises a two-piece clamping member which is clamped to a fender of said vehicle.

13. The resilient vehicle side bumper of claim 12, wherein said two-piece clamping member comprises:

(a) a first piece which, when clamped to said vehicle fender, is located on said outer surface of said fender;

(b) a second piece which, when clamped to said vehicle fender, is located on an inner surface of said fender, said second piece comprising a saw-toothed surface for gripping an in-turned flange of said fender, said second piece further comprising a first radiused foot in contact with said inner surface of said fender and a second radiused foot in contact with said first piece of said clamping member; and (c) a threaded screw which passes through aligned apertures in said first piece and said second piece of said clamping member to hold and tighten said first piece and said second piece of said clamping member onto said fender.

14. A resilient vehicle side bumper for attachment to a side of a vehicle, comprising:

(a) an elongated resilient body member having a forward end and a rearward end; and (b) means extended from said forward end and said rearward end for securing said elongated body member to said vehicle, said securing means comprising a first fastening member located at the end of an elastic member, said elastic member which is, in turn, connected to said resilient body member, said elastic member capable of expanding sufficiently to allow said first fastening member to be fastened to a second mated fastening member located on said vehicle for releasable interconnection with said first fastening member, said second fastening member comprising a two-piece clamping member which is clamped to a fender of said vehicle, said second fastening member further comprising:

(i) a first piece which, when clamped to said vehicle fender, is located on said outer surface of said fender;

(ii) a second piece which, when clamped to said vehicle fender, is located on an inner surface of said fender, said second piece comprising a saw-toothed surface for gripping an in-turned flange of said fender, said second piece further comprising a first radiused foot in contact with said inner surface of said fender and a second radiused foot in contact with said first piece of said clamping member; and (iii) a threaded screw which passes through aligned apertures in said first piece and said second piece of said clamping member to hold and tighten said first piece and said second piece of said clamping member onto said fender.

15. The resilient vehicle side bumper of claim 14, further comprising:

means for connecting said first fastening member and said second fastening member together.

16. The resilient vehicle side bumper of claim 15, wherein said connecting means comprise:

(a) a projecting pin located upon said first fastening member; and (b) a slot located in said second fastening member for receiving said pin of said first fastening member.

17. The resilient vehicle side bumper of claim 16, further comprising:

means for locking said first and second fastening members together.

18. The resilient vehicle side bumper of claim 17, wherein said locking means comprise:

a locking device integrated with said second fastening member such that when said projected pin of said first fastening member is received in said slot of said second fastening member and said locking device is engaged, said locking device blocks removal of said projected pin of said first fastening member from said slot of said second fastening member.

19. The resilient vehicle side bumper of claim 14, wherein said first fastening member comprises:

a cylindrical body having an arcuate passageway for receipt of said elastic member, said arcuate passageway extending from an entrance port in an outer side edge of said cylindrical body to an exit port in said outer side edge of said cylindrical body.

20. The resilient vehicle side bumper of claim 19, wherein:

said arcuate passageway in said cylindrical body of said first fastening member is open in its upper direction.

21. The resilient vehicle side bumper of claim 20, wherein:

said first fastening member includes a cover for fitment atop said cylindrical body and over said open arcuate passageway.

22. The resilient vehicle side bumper of claim 19, wherein:

said entrance port and said exit port of said arcuate passageway are located proximate to one another in said outer side edge of said cylindrical body.

23. The resilient vehicle side bumper of claim 19, wherein:

said elastic member has a diameter greater than a diameter of said arcuate passageway.

24. The resilient vehicle side bumper of claim 21, wherein:

said first fastening member includes protruded teeth for penetrating and gripping said elastic member.

25. A fastening member for attachment to an end of an elastic member, said fastening member comprising:

a cylindrical body having an arcuate passageway for receipt of said elastic member, said arcuate passageway extending from an entrance port in an outer edge of said cylindrical body to an exit port in an outer edge of said cylindrical body.

26. The fastening member of claim 25, wherein:

said arcuate passageway in said cylindrical body of said fastening member is open in its upper direction.

27. The fastening member of claim 26, wherein:

said fastening member includes a cover for fitment atop said cylindrical body and over said open arcuate passageway.

28. The fastening member of claim 25, wherein:

said entrance port and said exit port of said arcuate passageway are located proximate to one another in an outer side edge of said cylindrical body.

29. The fastening member of claim 25, wherein:

said elastic member has a diameter greater than a diameter of said arcuate passageway.

30. The fastening member of claim 27, further comprising:

protruded teeth for penetrating and gripping said elastic member.

* * * * *